United States Patent Office 3,537,018
Patented Oct. 27, 1970

---

3,537,018
PHASE SENSITIVE DETECTOR
Victor J. Modiano, Anaheim, Calif., assignor to the United States of America as represented by the Secretary of the Air Force
Filed Aug. 2, 1968, Ser. No. 749,726
Int. Cl. H03d 13/00
U.S. Cl. 328—133        2 Claims

ABSTRACT OF THE DISCLOSURE

A phase sensitive detector apparatus for determining the phase difference between two sine waves by equally phase shifting the two sine waves and then pairing off one sine wave with one phase shifted sine wave and the other sine wave with the other shifted sine wave. An output occurs only during the time a sine wave pair are simultaneously negative. Thus, the phase difference of the two sine waves is obtained by measuring the interval of the time between the two sine wave pair outputs.

BACKGROUND OF THE INVENTION

This invention relates to apparatus for electronically sensing the phase difference between two sine waves. More particularly, it relates to apparatus for deriving a signal whose amplitude is proportional to the phase difference between the two sine waves and determining the phase shift on a cycle-by-cycle basis so thaat the phase shift of each cycle may be observed.

In the prior art phase detection systems, it was often required to examine an incoming sinusoidal signal at its maximum slope while the other sinusoidal signal is going through zero voltage to determine the phase difference therebetween. The sampling of sinusoidal signals under these conditions is the ideal case to determine phase differences but require the use of filtering which is objectionable. One of the main objections to filtering is the resultant increased time interval that occurs before a positive indication of the phase difference between the two signals can be obtained. Another objection is the inability of the prior art to obtain and present phase shift information on a cycle-by-cycle basis. Whereupon, in many applications, the use of high frequency signals (4 mHz.) and the need for phase shift information on a cycle-by-cycle is necessary, the prior art cannot satisfy these requirements. A typical phase detector normally requires several complete cycles during which to overcome the transients initiated by a change in the phase of one of the signals.

SUMMARY OF THE INVENTION

The basis for the invention is the integration that is made to occur when two sine waves are simultaneously negative (or positive). Assume that $V_1$ and $V_2$ are the two sine waves, and that $V_{1s}$ and $V_{2s}$ are equally phase-shifted sine waves derived from $V_1$ and $V_2$. When there is no phase-shift between $V_1$ and $V_2$, then $V_1$ and $V_{2s}$ are simultaneously negative at the same time $V_2$ and $V_{1s}$ are simultaneously negative. If $V_2$ was to lag $V_1$ slightly, then $V_1$ and $V_2$ would not be simultaneously negative as long as previously and $V_{1s}$ and $V_2$ would be simultaneously negative longer than in the previous situation. Thus, by measuring the difference in these times, an indication of phase difference is possible. A convenient way to measure this time is by integrating a fixed current for each group during the period the voltages are simultaneously negative and generating voltages that are proportional to these times. These voltages are then applied to a differential amplifier which subtracts the voltages and generates an indication of the phase difference between the input sine waves $V_1$ and $V_2$.

It is one object of the invention, therefore, to provide an improved phase detector apparatus having an instantaneous indication of the phase difference between two sinusoidal signals.

It is another object to provide an improved phase detector apparatus providing on a cycle-by-cycle basis the difference in phase between two sinusoidal signals.

It is yet another object to provide an improved phase detector apparatus having substantially higher range of frequencies which is economical to produce and utilizes conventional currently available materials that lend themselves to standard mass production manufacturing techniques.

These and other advantages, objects and features of the invention will become more apparent from the following detailed description when taken in conjunction with the illustrative embodiments in the accompanying drawings.

DESCRIPTION OF THE PREFERRED EMBODIMENTS

Figure 1:
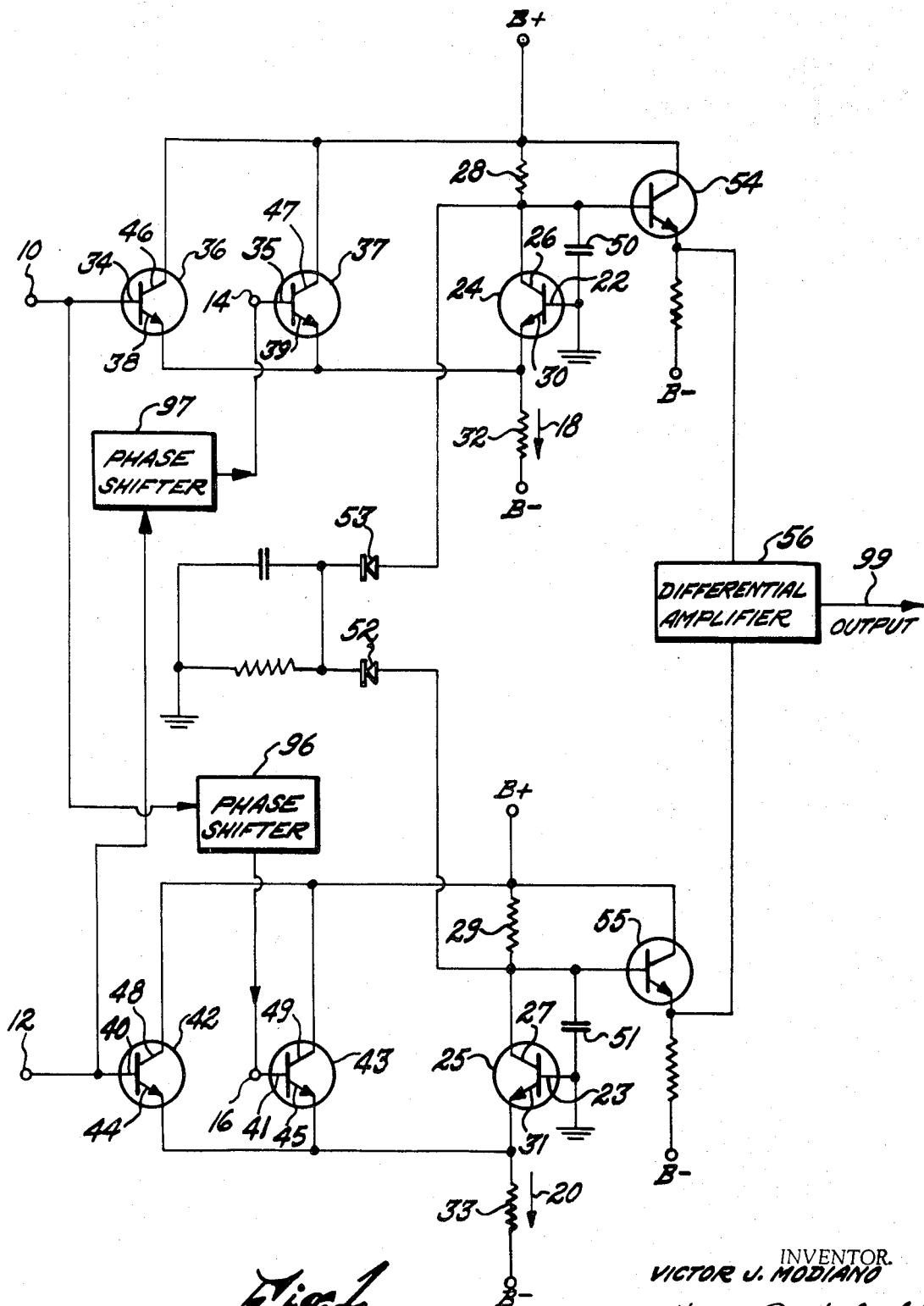
FIG. 1 is a schematic circuit diagram of the phase sensitive detector in accordance with this invention.

Now referring to FIG. 1, one sinusoidal input signal is received by terminal 10 and another at terminal 12. The purpose of the apparatus is to generate an indication representative of any phase difference between these two signals. This indication takes the form of a voltage difference which appears at the output of terminal 99 of differential amplifier 56.

The input signal at terminal 10 is shifted in phase by a predetermined amount by phase shifter 96 and received by terminal 16 and simultaneously the input signal at terminal 12 is also phase shifted the identical aforementioned predetermined amount by phase shifter 97 and received by terminal 14. The minimum amount of phase shift that is necessary is limited by the type of transistors used and could be as low a 50 nanoseconds. Any further reduction in this time is dependent upon the state of the transistor art. At the other extremity, the delay introduced preferably corresponds to less than the time required for one-quarter cycle at the frequency of the two input signals. Thus, the higher the frequency, the shorter the maximum delay between the phase shifted signals. It should be understood that any method of generating a relative phase shift can be used.

It is appropriate to point out that when signals to terminals 10 and 12 are in phase with each other, the signals to terminals 10 and 14 would both go negative concurrently with the signals to terminals 12 and 16. However, when there is any change in phase between signals to terminals 10 and 12, the time that one pair of signals would both be negative would decrease while the time that the remaining pair of signals would both be negative would increase. The present apparatus generates an indication of this difference during which both pairs of signals are concurrently negative to provide an indication of a difference in phase between the input signals to terminals 10 and 12. In general terms, this is achieved by gating the two pairs of signals in such a manner that a current 18 and 20 flows only during periods that each voltage of the respective pairs are negative. The time that each voltage of the respective pairs are both negative is measured by integrating the current 18, 20, thereby to generate voltages that are proportional to these times. These voltages are then subtracted to generate an indication of the phase difference between the input signals 10 and 12.

More particularly, the above operation is achieved as follows: the respective bases 22, 23 of transistors 24 and 25 are both references to ground. The respective collectors 26, 27 of these transistors 24 and 25 are returned through resistors 28 and 29 to a source B+ potential and the respective emitters 30, 31 thereof connected through respective load resistors 32, 33 to a source of B− potential so that the current 18, 20 flows through each of the transistors 24 and 25 when switched on. The signals fed to terminals 10 and 14 are applied to the respective bases 34, 35 of transistors 36 and 37, the emitters 38, 39 of which are both connected to the emitter 30 of transistor 24. Similarly, the signals fed to terminals 12 and 16 are applied to the respective bases 40, 41 of transistors 42 and 43, and the emiters 44, 45 are connected to the emitter 31 of transistor 25. The collectors 46, 47, 48, 49 of each of the transistors 36, 37, 42 and 43 are all returned to the source of B+ potential. Capacitor 50 is connected from the resistor 28 to ground and capacitor 51 from the resistor 29 to ground. The capacitance of capacitors 50 and 51 are equal. When transistor 24 is switched "on," current 18 flows out of capacitor 50, thus effectively performing an integration in a negative direction. Likewise, when transistor 25 is switched on, the current 20 flows out of capacitor 51, thus again performing an integration in a negative direction. The diodes 52 and 53 clamp the voltage across 50 and 51 at the same positive potential from which the integration starts. This potential is approximately +8 volts. Thus, in each case, current flow is integrated when both of the signals applied to the bases 34, 35 of transistors 36 and 37 or to the bases 40, 41 of transistors 42 and 43 are both negative. The voltages on the respective capacitors 50 and 51 are applied through transistors 54 and 55 respectively to the differential amplifier 56. The differential amplifier 56 performs a subtraction, thereby providing an indication at terminal 99 of the phase difference between the input signals to terminals 10 and 12 which may be measured or observed by any of the well-known conventional methods.

Figure 2:
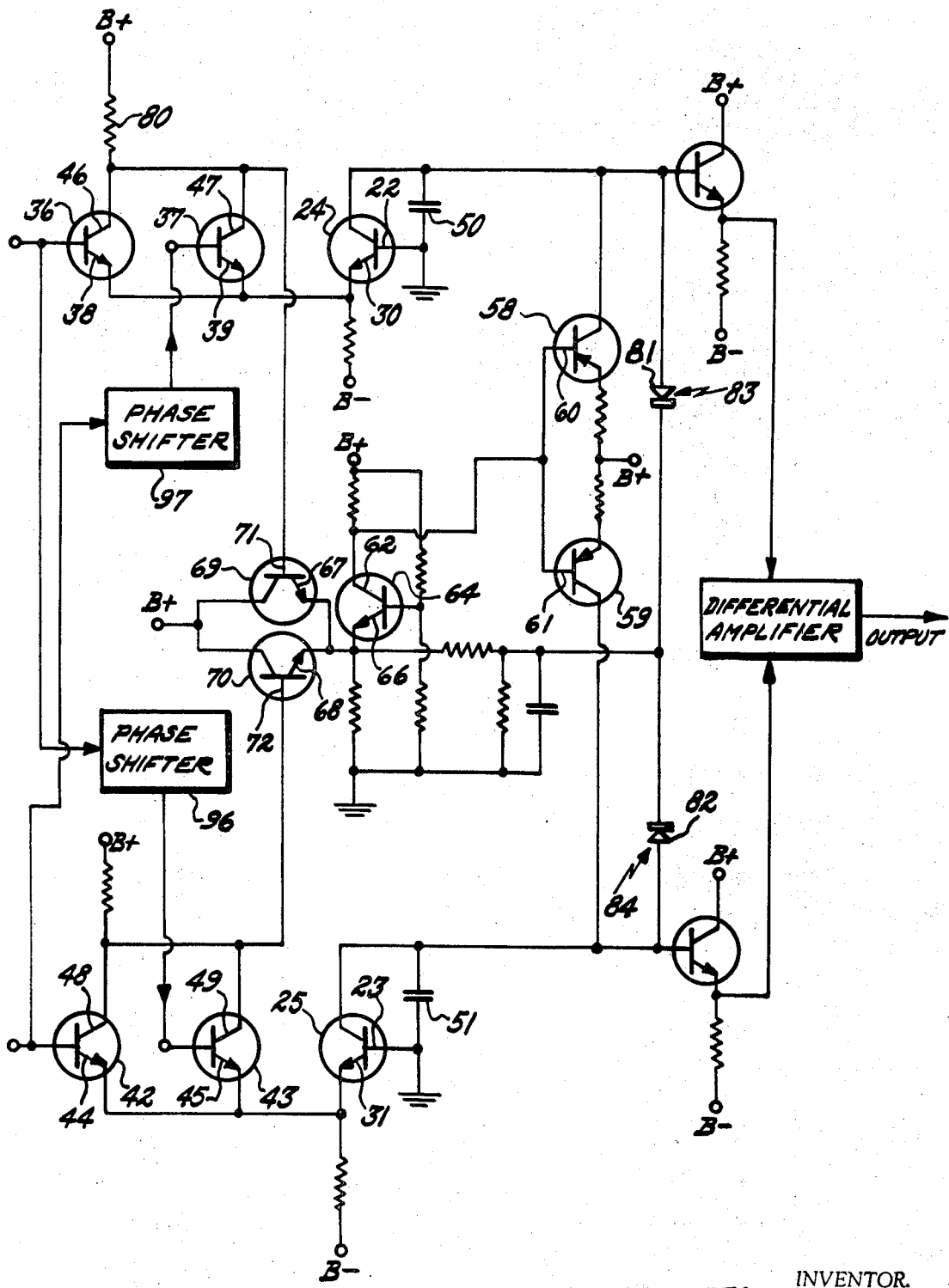
FIG. 2 is a schematic circuit diagram illustrating a modification of the FIG. 1 circuit.

Referring now to FIG. 2 in which there is illustrated a further embodiment of the circuit of FIG. 1 incorporating additional switching circuitry. The designations in common to FIG. 1 represent the same elements. The charging of capacitors 50 and 51 to the quiescent potential level is now controlled by transistors 58 and 59 respectively. Current flow through the transistors 58 and 59 is controlled concurrently by connections from both of the bases 60, 61 thereof to the collector 62 of a transistor 64.

The emitter 66 of transistor 64 is, in turn, connected to the emitters 67, 68 of transistors 69 and 70. The base 71 of transistor 69 is connected to the collectors 46, 47 of transistors 36 and 37 and the base 72 of transistor 70 is connected to the collectors 48, 49 of transistors 42 and 43. In general, when either base 71 or 72 of transistor 69 or 70 is positive, the voltage applied to the base 60, 61 of transistors 58 and 59 through transistor 64 is raised thereby cutting off current flow through these transistors. On the other hand, when the bases 71, 72 of transistor 69 and 70 are less positive, the transistor 64 is allowed to draw current thereby lowering the voltage applied to the respective bases 60, 61 of transistors 58 and 59, thus allowing the capacitors 50 and 51 to charge back to the quiescent level. The potential applied to either base 71 or 72 of transistor 69 or transistor 70 when only one of the transistors 36 or 37 and one of the transistors 42 or 43 is conducting is sufficiently "less positive" than the positive voltage required to switch "on" the transistors 58 and 59.

It will be noted that the respective bases 22, 23 of transistors 24 and 25 are referenced to ground and the emitters 30, 31 thereof are maintained substantially at ground potential. Since the emitters 38, 39 of transistors 36 and 37 are connected to the emitter 30 of transistor 24 and since the emitters 44, 45 of transistors 42 and 43 are connected to the emitter 31 of transistor 25, current are controlled by the polarity of the signals to terminals 10, 14 and 12, 16, respectively. Thus, when signals to terminals 10 and 14 are both negative, current flow is cut off through transistors 36 and 37 and is switched on through transistor 24. Since there is no current flowing through the resistor 80 connecting the source of the B+ potential to transistors 36 and 37, the potential applied to the base 71 of transistor 69 is positive. Similarly, when the polarity of signals to terminals 12 and 16 are both negative, the potential applied to the base 72 of transistor 70 is positive. Thus, when either signal pairs to terminals 10 and 14, or 12 and 16 are both negative, transistors 58 and 59 are switched off, thus preventing capacitors 50 and 51 from being recharged to its quiescent potential level. By preventing the capacitor 50 or 51 from recharging until the other capacitor commences to do so, the first integration is stored until the second integration is complete, whereby the difference represents the phase difference between the signals to terminals 10 and 12.

In addition, when the voltage at the anodes 81, 82 of diodes 83, 84 increases, the voltage at the collector 62 of 64 increases. This causes the current through transistors 58 and 59 to decrease and permits a rapid turnoff of these transistors when transistor 64 ceases to conduct.

Although the invention has been described with reference to particular embodiments, it will be understood to those skilled in the art that the invention is capable of a variety of alternative embodiments within the spirit and scope of the appended claims.

I claim:
1. Apparatus for determining any difference in phase between a first and second sinusoidal signal having the same frequency comprising:
   (a) means for receiving a first and second sinusoidal signal;
   (b) means for phase shifting each of said first and second sinusoidal signals an equal amount to provide a first and second equally phase shifted sinusoidal signal;
   (c) first means for gating said first sinusoidal signal with said second equally phase shifted sinusoidal signal, said gating means producing a first output signal only during the time when both said first sinusoidal signal and said second equally phase shifted sinusoidal signal are simultaneously negative;
   (d) first means for integrating said first output signal and for generating a first voltage proportioned to the time of integration of said first output signal;
   (e) second means for gating said second sinusoidal signal with said first equally phase shifted sinusoidal signal, said gating means producing a second output signal only during the time when both said second sinusoidal signal and said first equally phase shifted signal are simultaneously negative;
   (f) second means for integrating said second output signal and for generating a second voltage proportional to the time of integration of said second output signal;

(g) differential amplifier means for said first and second output signals, said differential amplifier means determining the time difference between said first output signal and said second output signal with said time difference being the phase difference between said first and second input sinusoidal signals;

(h) first means for coupling said first output signal to said differential amplifier means; and (i) second means for coupling said second output signal to said differential amplifier means.

2. Apparatus as defined in claim 1 further including control means coupled to said first and second integrating means to permit the integration to occur simultaneously.

References Cited

UNITED STATES PATENTS

| | | |
|---|---|---|
| 3,177,428 | 4/1965 | Klayman. |
| 3,330,972 | 7/1967 | Malan _____ 307—232 XR |
| 3,469,196 | 9/1969 | Cowin et al. _____ 328—133 |

STANLEY T. KRAWCZEWICZ, Primary Examiner

U.S. Cl. X.R.

307—232, 295; 324—83; 328—127